(12) United States Patent
Rawlings

(10) Patent No.: US 6,341,760 B1
(45) Date of Patent: Jan. 29, 2002

(54) METERING DEVICES

(76) Inventor: Matthew James Harold Rawlings, Lingerfield, Willingham By Stow, Gainsborough DN21 SJX (GB)

(*) Notice: Subject to any disclaimer, the term of this patent is extended or adjusted under 35 U.S.C. 154(b) by 0 days.

(21) Appl. No.: 09/424,568

(22) PCT Filed: May 27, 1998

(86) PCT No.: PCT/GB98/01546

§ 371 Date: Nov. 24, 1999

§ 102(e) Date: Nov. 24, 1999

(87) PCT Pub. No.: WO98/53676

PCT Pub. Date: Dec. 3, 1998

(30) Foreign Application Priority Data

May 27, 1997 (GB) ................................. 9710834

(51) Int. Cl.$^7$ ............................. F16K 5/04; F16K 7/17; F16K 15/14; B05B 1/16
(52) U.S. Cl. .................. 251/207; 137/487.5; 137/488; 137/510
(58) Field of Search ................. 137/510, 488, 137/487.5; 251/207

(56) References Cited

U.S. PATENT DOCUMENTS

| 2,101,356 A | * 12/1937 | Zak | .......................... 251/207 |
| 4,058,260 A | * 11/1977 | Lestradet | ................... 239/394 |
| 4,630,642 A | * 12/1986 | Detweiler | ................. 137/614.2 |
| 4,961,441 A | * 10/1990 | Salter | ...................... 137/487.5 |
| 5,678,601 A | * 10/1997 | Engel | ...................... 137/487.5 |
| 5,931,186 A | * 8/1999 | Skoglund | .................... 137/488 |

FOREIGN PATENT DOCUMENTS

| CH | 227839 | 10/1943 |
| FR | 1227737 | 8/1960 |
| GB | 2164126 A | 3/1986 |

OTHER PUBLICATIONS

International Preliminary Examination Report, PCT/GB98/01546, mailed Aug. 25, 1999.
International Search Report, PCT/GB98/01546, mailed Dec. 15, 1998.

* cited by examiner

*Primary Examiner*—Michael-Powell Buiz
*Assistant Examiner*—Ramesh Krishnamurthy
(74) *Attorney, Agent, or Firm*—Wilburn L. Chesser, Esq.; Piper Marbury Rudnick & Wolfe LLP

(57) ABSTRACT

In a rotary metering valve, a metering block is located in a chamber having a plurality of outlets. The metering block is connectable to a fluid supply and has an outlet selector rotatable to select one of several different outlets from the block to the chamber. A barrier extends between the wall of the chamber and the metering block to prevent fluid flowing in a 360 degree rotary motion around the block. A sprayer check valve is also disclosed. The valve has a diaphragm acted on by control fluid whose pressure is set to just below the spray fluid pressure and which is varied according to variations in the spray fluid pressure.

8 Claims, 16 Drawing Sheets

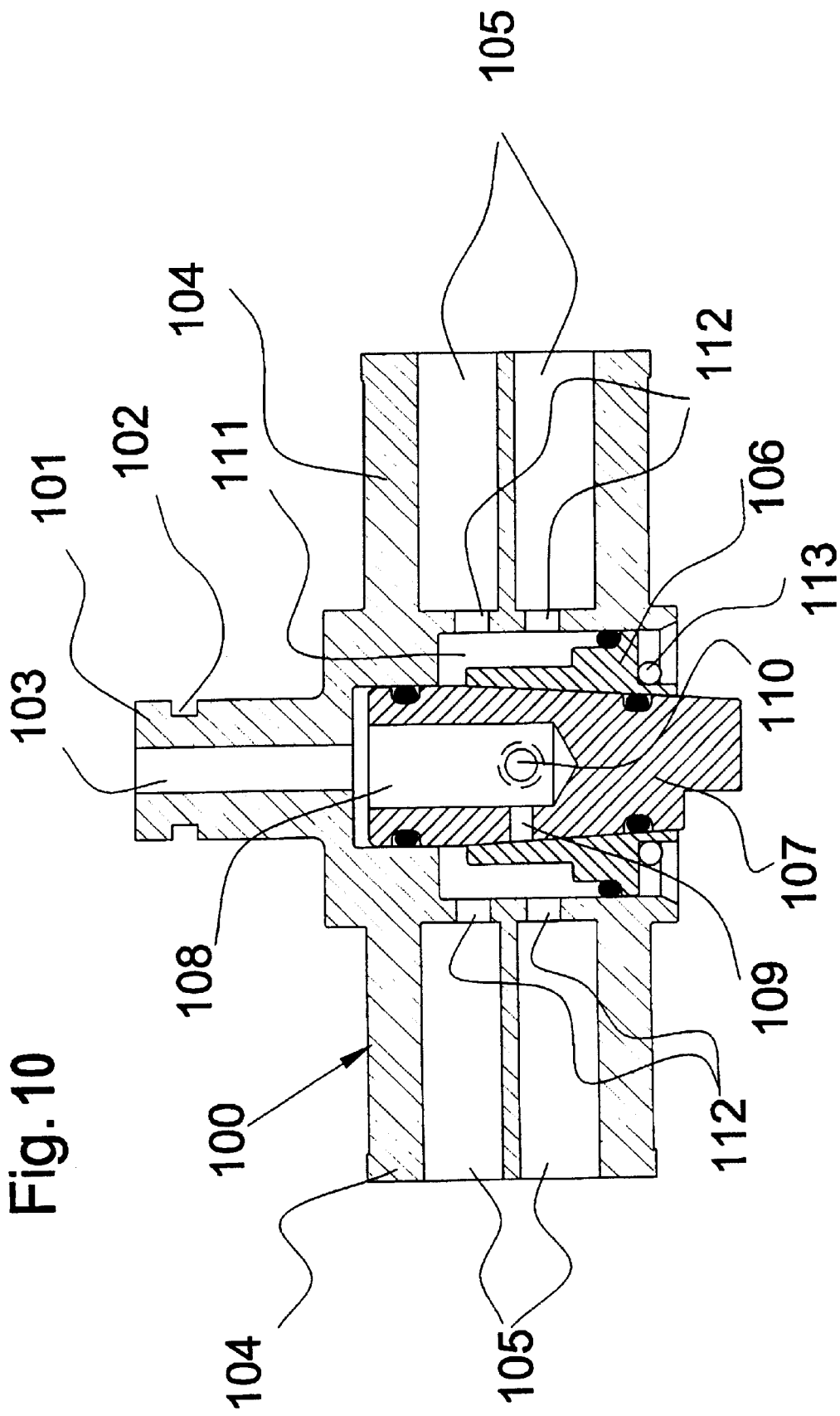

METERING DEVICES

FIELD OF THE INVENTION

This invention relates to improvements in metering devices, and particularly to metering devices used in agricultural and horticultural spraying devices and related application equipment.

BACKGROUND TO THE INVENTION

Sprayers are used in agriculture and horticulture for applying chemicals and/or liquid fertilisers to growing crops, and for the treatment of harvested produce.

Generally, sprayers have a series of outlets across the width of the sprayer boom. Each outlet through which liquid is passed is provided with a check valve, commonly known as an Anti Drip Check Valve, and the check valve is generally equipped with a means to attach a nozzle or applicator on the downstream side of the check valve. Check valves are provided to prevent liquid flowing from the outlets when the said liquid is below a predetermined pressure. For example, a check valve may be set up so that liquid may not pass through the valve unless the liquid is at the intended working or application pressure.

Check valves are available in various different forms. The most common type used in agricultural and horticultural sprayers comprises a sealing diaphragm maintained against a sealing face by a compressed coil spring, the spring rate, or loading of which is determined by the pressure at which the valve is required to open and the surface area of the sealing diaphragm.

In practice when the supply pressure to the sprayer boom is switched off, the pressure in the boom supply line drops and when below the level at which it exerts sufficient force to maintain the spring loaded diaphragm check valve in an open position, the valve shuts. The length of time taken for the line pressure to drop after shut off can be lengthy, and increases as higher spraying pressures are used. Given the characteristics of the spring loaded diaphragm check valve they are not generally used in high pressure sprayer applications.

In another type of check valve, a ball loaded against an annular sealing face by a coil spring is used. Ball type check valves are generally used where sprayers are operated at higher pressures, because unlike the spring loaded diaphragm check valve their sensitivity is not dependent on, or effected by, pressure acting over a large surface area to withhold the ball from the point of sealing and therefore provide outlets with a quicker shut off.

Where high spraying pressures are to be used, it is common to provide a spring loaded check valve downstream of a spring loaded diaphragm valve to facilitate quick shut off of the outlet and manufacturers of check valves as described commonly accommodate such practice by providing suitable fittings to their check valve products.

Certain crops, ground conditions, weather conditions or chemicals require different operating pressures to be used necessitating switching over from a high pressure application to a low pressure application and vice versa. This causes time delays due to the assembly and disassembly of components. There is also a risk of components being mixed up and the operator being contaminated with toxic chemical.

Passive check valves, be they diaphragm or ball valves, share a common problem. The problem is that a time delay exists between the moment at which the liquid supply is turned off at source, and the time at which the pressure in the boom drops sufficiently for the check valves to operate and so prevent the flow of liquid from the outlets. The further away from the centre of the boom a particular nozzle is, the longer is the time delay. At present, sprayers having booms of 24 meters are often used. When operating at 2.5 to 3.0 bar and depending on the spray nozzles fitted downstream of the outlet, an operator may observe a time delay of ten seconds between shutting off liquid flow, and liquid ceasing to flow through the outlets. This causes crop damage due to patches of crop being overdosed which in turn may lead to environmental damage, and is of course a waste of valuable resource. For example, a sprayer travelling at 12 km/h may travel 33 meters in the interval between the operator shutting off the flow of liquid and the outlets actually being closed off. There is a particular problem found in brassica crops when turning at headlands. This is because brassica crops are very sensitive to chemicals and at row ends and headlands some of the crop will almost inevitably be double dosed. This has led farmers to leave field headlands unplanted which represents a considerable reduction in effective land usage.

In some countries stringent environmental protection laws have been introduced to limit the application of chemicals, such as fungicides, herbicides, pesticides or fertilisers, per unit area in given time periods in order to reduce the risk of ground water being contaminated by the said chemicals. The potential liabilities, in terms of penalties, resulting from double dosing caused by inaccurate shut-off valves is therefore of prime concern to the farmer.

A further problem posed by spring operated check valves is that operating performance is governed by the accuracy of the springs fitted within them. Coil springs are manufactured in a manner whereby the spring ratings have wide tolerances. Where springs are designed to operate check valves at 1.0 bar for instance, due to the tolerance in the spring rating one check valve may not open until a pressure of 1.1 bar is reached, whilst the check valve in an adjacent outlet may open at a pressure of 0.8 bar. Clearly, in the precision application of chemicals and fertilisers this is most undesirable.

In the spraying of liquid fertilisers it is desirable to operate at low pressures. This is because higher pressures produce fine droplets in the form of a mist which may remain on the leaves of the plants and lead to burning of the crop. In order to produce large droplets, lower pressures must be used. Conventional check valves limit the lower range of operating pressures since spring operated check valves do not operate reliably below 1 bar. Whilst liquid fertiliser can be applied at 1 bar it is desirable to operate at even lower pressures.

It would therefore be desirable to provide a check valve having controllable shut-off which can be opened at low operating pressures and which has very fine tolerances on its opening and closing pressures.

Spring loaded diaphragm check valves of the type so far described pose additional problems to users. At the time the sprayer boom is folded for transport, and/or during normal transport to or from the site of spraying, any liquid remaining in the boom supply lines tends to surge, as a result of movement, which causes localised increases in internal pressure sufficient to open the check valve and thereby allow liquid to escape. Such escape can lead to unintended contact with other crops as the sprayer passes by, double dosing or worse spraying the operator or passers by who become contaminated with toxic chemical. Such escape would permit corrosive solutions to come into contact with the sprayer, and this is particularly damaging in the case where the liquid is fertiliser. It would therefore be desirable to provide a check valve which may be adjusted to open and close at any desired pressure. It Is also desirable to provide a check valve having its shut off at a pressure closely adjacent to the operating pressure of the sprayer, which pressure may vary with time, and would therefore allow the pressure in the supply to the inlet to remain at a level close to the operating pressure required when spraying is resumed. Such a feature would reduce the time taken for full operating pressure to be achieved when the operator switches a sprayer back on when re-entering a crop.

As mentioned above, generally, sprayers have a series of outlets across the width of the sprayer boom. Each outlet through which liquids are passed is generally provided with a check valve which is generally equipped with a means to attach a nozzle or applicator on the downstream side of the check valve. The nozzle or applicator distributes the flow of liquid in a manner specific to the desired or most appropriate application method for the given chemical or fertiliser and is generally selected by the operator who takes into account the liquid being applied as well as crop and weather conditions and intended speed of application. In many cases the nozzle or applicator design is such that the outlet design regulates the flow of liquid and at the same time disperses the liquid in an optimum fashion. For example, a fan jet nozzle will regulate the flow of liquid dependent of the liquid pressure and then distribute the liquid in droplets of a particular size and density in a fan shaped pattern.

There are nozzles and applicators which do not embody the same characteristics as the type previously describes, and which therefore require additional and separate methods of regulating or metering the flow so as to provided a necessary control on the volume of liquid flowing from the particular sprayer outlet. In different applications it may be necessary to apply different volumes of liquid. In order to provide for this metering discs or nozzles are used, the metering discs generally fitting between the nozzle or applicator attaching means and the outlet or the outlet of the check valve. When applying liquid fertiliser with a dribble bar, a metering disc is used.

A metering disc generally has an aperture in its centre, the diameter of the aperture providing for a range of application volumes over the range of pressures for which the nozzle or applicator is designed to operate. When the limits of the range are reached, it is necessary to change the metering valve for another having a differently sized aperture.

There are many different sized metering discs or orifices available, typically however, to cover the requirements of most agricultural and horticultural applications three different metering discs are needed for any one nozzle or applicator. The time taken to change the metering disc for each outlet is great, and as the size of booms tends to increase so does the significance of the time taken to change metering discs/nozzles.

It would therefore be desirable to provide a metering mechanism which does not require the changing of metering discs and which provides a range of metering which spans most commonly used application rates.

SUMMARY OF THE INVENTION

The invention provides a check valve comprising a body having an inlet and an outlet, an inlet chamber and an outlet chamber mounted in the said body between the inlet and the outlet, the said inlet chamber being provided with a check valve to permit or prevent the flow of liquid from the inlet chamber to the outlet chamber, the check valve comprising a diaphragm and pressurising means to exert a pressure on the said diaphragm, wherein the pressurising means provides for a variable pressure to be exerted on the said diaphragm.

One aspect of the invention provides a kit of parts comprising a diaphragm and pressurising means to exert a pressure on the said diaphragm when said diaphragm is attached to a check valve comprising a body having an inlet and an outlet, an inlet chamber and an outlet chamber mounted in the said body between the inlet and the outlet, the said inlet chamber being provided with a check valve to permit or prevent the flow of liquid from the inlet chamber to the outlet chamber, wherein the pressurising means provides for a variable pressure to be exerted on the said diaphragm.

The pressurising means may be pneumatic, or hydraulic. Alternatively. the pressurising means may comprise an electrically or electronically activated actuator, such as a solenoid.

The pressurising means may exert a pressure in the range 0.3 Bar to 6 Bar on the diaphragm.

In another embodiment of the invention, the pressurising means may exert a pressure of up to 20 Bar. Such high pressures are often used in aerial crop spraying.

Advantageously, the diaphragm is formed from an elastomeric material, and preferably the thickness of the diaphragm is between 0.5 and 1.5 mm.

Preferably, the diaphragm is held in place by an end cap. The end cap and the body may be provided with co-operating attachment means. The attachment means may be a bayonet fitting, or screw threads.

In one embodiment of the invention, the cap comprises an aperture and a nozzle to which an air or hydraulic supply may be attached.

Where the pressurising means is hydraulic or pneumatic the diaphragm may be pre-shaped and/or pre-stressed so that as the pressure exerted by the pressurising means decreases the diaphragm lifts away from its sealing position. Preferably, the diaphragm is pre-stressed so that in a resting position it is in compression. Advantageously, the diaphragm is very thin in cross-section.

The combination of a diaphragm which is both thin and pre-shaped and/or pre-stressed results in a diaphragm that is very sensitive and which responds very quickly to changes in pressure exerted on the diaphragm by the pressurising means, thereby enabling fast and accurate shut off or opening of fluid flow from the inlet to the outlet of the check valve.

The outlet chamber may comprise a pipe which extends within the inlet chamber.

A dribble bar, or any other suitable nozzle, may be attached to the outlet, and the body of the valve may be adapted to provide for such attachment.

In one embodiment of the invention there is provided a detection and control means to detect the fluid pressure in the body of the valve and adjust the pressure exerted by the pressurising means in response to the detected fluid pressure thereby providing shut off pressures which are in close proximity to actual operating pressures. The fluid pressure may be detected in the inlet chamber or the supply to the inlet. The pressure exerted by the pressurising means may follow the fluid spraying pressure, so that the pressure exerted by the pressurising means on the diaphragm is only fractionally greater or less than the spraying fluid pressure.

The control means may be adapted to cause the pressurising means to exert sufficient pressure to cause shut off of the check valve when the fluid pressure falls below a pre-set value. The control means may be arranged to exert a pressure on the diaphragm which is proportional to the fluid pressure detected. Alternatively, the control means may be arranged to exert a pressure on the diaphragm which is a greater or less than the fluid pressure by a fixed amount, e.g. 0.5 bar greater or less than the fluid pressure.

The invention provides a rotary metering valve comprising a metering block having an inlet connectable to a fluid supply and at least one outlet, and an outlet selector having at least one aperture therein for alignment with an outlet of the metering block to permit flow of a fluid therethrough, wherein the outlet selector and the metering block are arranged to permit relative rotation of one with respect to the other, and a means to rotate the outlet selector and/or the metering block.

The metering block may be cylindrical. The outlet selector may be cylindrical.

Typically the outlet selector is arranged to envelop a portion of the metering block, or to be enveloped by a portion of the metering block.

The metering block may be provided with a plurality of outlets and the outlet selector is provided with one aperture. The metering block is suitably provided with three outlets. The metering block may be provided with one outlet and the outlet selector may be provided with a plurality of outlets. The metering block may be provided with a plurality of outlets and the outlet selector may be provided with a plurality of apertures. The or each outlet of the metering block may comprise a bore in a wall thereof. Where more than one outlet is provided in the metering block, the sizes of the outlets may differ. Where more than one aperture is provided in the outlet selector, the sizes of the apertures may differ.

The metering block may be fixed and the outlet selector may rotate relative to the said metering block. Alternatively, the outlet selector may be fixed and the metering block may rotate relative to the said outlet selector.

The metering block may be secured in a body. Preferably, the outlet selector fits over the metering block, and more preferably, a cap holds the metering block and the outlet selector in position within the body. The cap may be held in place by screw threads, a bayonet fitting, or other suitable attachment means. The cap may sit against an external flange.

Preferably, the cap has a portion through which part of the outlet selector extends, seals such as "O" rings being provided to prevent egress of fluid from within the body through the cap.

The metering block and outlet selector assembly may be mounted in a body, which body may be provided with at least one outlet. The body may comprise multiple outlets and may be substantially cylindrical. The body is suitably a dribble bar having multiple outlets.

In certain circumstances instead of an equal amount of liquid flowing from each of the body's outlets a different amount of fluid can flow from each outlet. This can be due to a rotational flow occurring between the inner wall of the body and the metering block and outlet selector assembly.

In one embodiment of the invention a barrier is provided between an inner surface the body and the metering block and outlet selector assembly. The barrier may extend from an inner wall of the body to the metering block and outlet assembly. The barrier may abut the outlet selector or the metering block. The barrier serves to balance and break flow of a rotational nature and is so formed to enable the accurate division of liquid between the outlets in the body.

Advantageously, the barrier is so located and dimensioned as to provide for an accurate division of liquid between the outlets in the body, the flow through each outlet being within the tolerance requirements for constancy of flow from singularly fed nozzles having multiple outlets as set out in national, international or industry standards and codes.

The barrier may be aligned with an axial centre line of the body, outlets being located to either side of the centre line. An equal number of outlets may be provided on either side of the said centre line.

In another embodiment of the invention, the number of outlets to either side of the centre line may be unequal, and the barrier may be positioned in the body to ensure that the flow to each outlet is equal.

The position of the barrier with respect to the outlet of the outlet selector and metering block assembly into the body can also effect the flow from the outlets in the body. The barrier may be aligned with the outlet of the outlet selector and metering valve assembly, or the barrier may be off-set from the outlet of the outlet selector and metering valve assembly.

The means to rotate the outlet selector may be a hand grip, lever, or spanner flats, and the said means may be provided on the part of the outlet selector which extends through the cap.

Alternatively, the means to rotate the outlet selector and/or the metering block may comprise an actuator, which actuator may be activated remotely, for example by a controller.

The body may be part of an outlet fitting for a sprayer or may be part of the nozzle which attaches to a sprayer outlet through which fluid finally leaves the sprayer.

Preferably the metering block is formed from stainless steel or suitable polymers or thermoplastics, which may be of the type known as engineering plastics. Alternatively, the metering block may be formed from brass, ceramics or other suitable materials.

The outlet selector and/or the body may be formed from a polymer or thermoplastic. Alternatively, the outlet selector and/or the body may be formed from machined or cast ferrous or non ferrous materials.

One aspect of the invention provides a valve assembly comprising a check valve comprising a body having an inlet and an outlet, an inlet chamber and an outlet chamber mounted in the said body between the inlet and the outlet, wherein the inlet chamber there is provided with a diaphragm which permits or prevents the flow of liquid from the inlet chamber to the outlet chamber, and pressurising means to exert a pressure on the said diaphragm, and the outlet chamber being provided with a rotary metering valve comprising a metering block having an inlet connectable to a fluid supply and at least one outlet, and an outlet selector having at least one aperture therein for alignment with an outlet of the metering block to permit flow of a fluid therethrough, the outlet selector and the metering block being arranged to permit relative rotation of one with respect to the other, and a means to rotate the outlet selector and/or the metering block is provided.

Preferably, the diaphragm is provided at upstream end of the inlet chamber.

The pressurising means may be hydraulically, pneumatically, electrically or mechanically operated. For example, the diaphragm may be held against a sealing face by means of a spring.

Advantageously, the rotary metering valve is attached to the downstream end of the outlet chamber.

The pressurising means may permit a variable pressure to be exerted on the said diaphragm.

According to another aspect of the invention, there is provided a sprayer having a check valve and/or a metering valve according to the invention.

In one embodiment of the invention, the control means may communicate with a satellite derived or computer generated mapping system, shutting off and opening one or more of the valves, and/or adjusting one or more rotary metering valve in accordance with information received from the said mapping system. The rotary metering valves may be motorised to enable them to be adjusted in response to a signal from the said mapping system.

The invention provides a metering valve which does not require disassembly in order to adjust the size of the aperture through which the liquid passes.

In one embodiment of the invention check valves according to the invention are controlled as a group in order to control fluid flow from individual sections of a sprayer boom. By using check valves in this manner, the use of mechanical fluid control valves, to shut off fluid being supplied to individual sections of a sprayer boom is not required. The arrangement also permits the sprayer to be equipped with one single feed line for the spray boom as opposed to sprayers of the prior art which have a plurality of fluid supply lines, the number of supply lines corresponding to the number of sections on the boom.

Another embodiment of the invention provides a sprayer comprising a tank provided with a feed line which extends from and returns to the tank, wherein the feed line is provided a valve to control the return of fluid in the feed line to the tank. Advantageously, the sprayer is provided with a controller and the said valve is controlled by the controller.

The sprayer is preferably provided with a pressure regulator which maintains the pressure in the feed line constant.

Preferably, the valve is a check valve according to the invention. The check valve may comprise a rotary metering valve according to the invention.

Alternatively, the valve may be a regulating valve such as a rotary valve, or a gate valve.

The provision of this feature allows chemical solutions to circulate constantly through the feed lines of sprayer boom even when the sprayer is not operating, so that the chemical remains mixed and available to the outlets at the required spraying pressure at all times. The re-circulation of liquid suspensions such as fertilisers is extremely desirable to ensure that they are applied to crops in a consistent solution and this feature provides a means of achieving this.

The valve provided in the feed line to control the return of fluid in the feed line to the tank may be used to allow recirculation during spraying. Where the valve is a check valve according to the invention the outlet of the valve may be of a size which permits a desired re-circulatory flow rate when the check valves controlling the flow of fluid through the sprayer nozzles are open. By combining a rotary metering valve with the check valve, different re-circulatory flow rates can be provided for. Alternatively, a regulating valve may be used in the feed line. In each case the position of the valve may be controlled by the controller.

Another benefit of the valve in the feed line to control the return of fluid in the feed line to the tank, is that a further means of controlling the flow rate of fluid through the sprayer nozzles is provided. This is because a proportion of fluid which would have passed through the nozzles is being returned to tank.

The check valve of the invention enables the time delay during the build up to operating pressure following check valve shut-off and resumption of spraying to be kept to a minimum. The speed at which the check valve operates can be adjusted by varying the pressure exerted on the diaphragm by the pressurising means. Increasing the pressure increases the speed of operation of the check valve.

Due to the absence of mechanical springs, the check valve of the invention does not suffer from variance in tolerance of spring ratings, and therefore is much safer and more accurate than presently available check valves, both in terms of crop and environmental damage. Furthermore, when used on a sprayer, where it is necessary to change the operating pressure thereof, rather than physically changing springs or actual check valves, the degree to which the diaphragm is pressurised may simply be adjusted either manually or by a control system as described herein.

The metering devices of the invention may be used in many different applications, but are particularly suited for use with agricultural and horticultural spraying machines. Furthermore, the metering devices of the invention can be supplied as integral components within nozzles or applicators which are fitted to spraying machines or as integral parts within check valve assemblies which may be retro-fitted to existing sprayers. Retro-fit kits may use existing outlet fittings and in the case of a check valve replaces the spring with a pressurising means of the invention, or in the case of a rotary metering valve replaces the metering disc.

BRIEF DESCRIPTION OF THE DRAWINGS

In the drawings, which illustrate exemplary embodiments of the invention:

FIG. 10 is schematic layout of a metering device according to the invention;

DETAILED DESCRIPTION OF THE DRAWINGS

Figure 2:
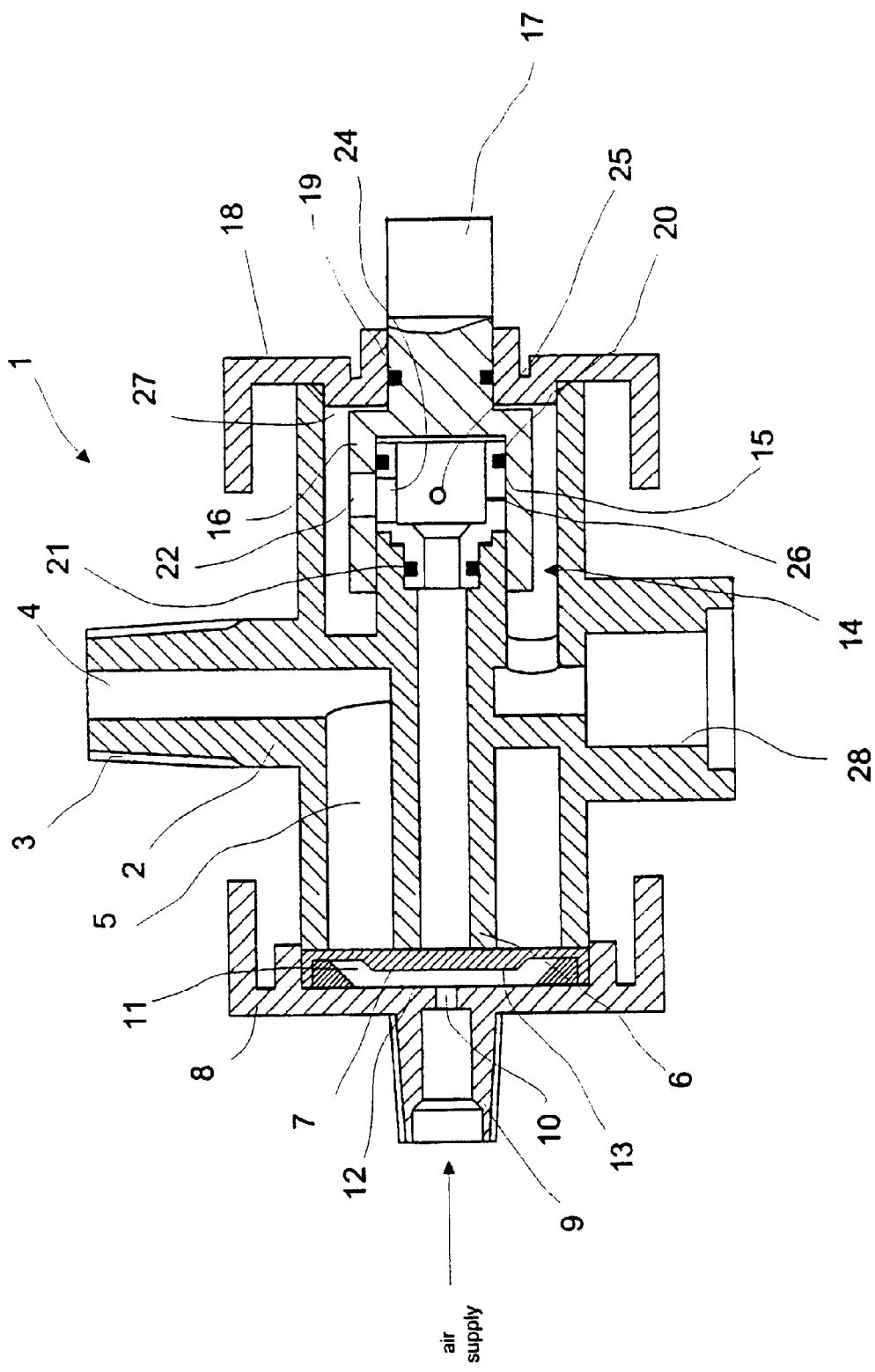
FIG. 2 is a cross-section through a sprayer fitting having a pneumatic check valve and a metering valve according to the invention.

Referring to FIG. 2, there is shown a fitting 1 having a main body 2 which is externally threaded 3 to provide for attachment of the fitting to an outlet on a sprayer boom (not shown). Attachment of the fitting to an outlet on a sprayer could be provided by a clamp arrangement or a spigot. The main body 2 is provided with an inlet in the form of a bore 4 which enters into the inlet chamber 5 of the body 2. Running centrally through the inlet chamber 5 is an internal spigot 6 which is hollow. An elastomeric diaphragm 7 sits on one end of the body 2 and the internal spigot 6 to prevent the flow of liquid through bore 4, inlet chamber 5 and through the hollow internal spigot 6. Diaphragm 7 is held in position by an end cap 8 which may be attached to the main body 2 by means of a bayonet fitting or threads. The cap 8 is provided with an attachment member 9 suitable for attachment to an air supply. Cap 8 has an aperture 10 therein which permits the passage of air into the chamber 11 between the inner face 12 of the cap 8 and the outer face 13 of the diaphragm 7. The effect of supplying air is to pressurize the chamber 11. Diaphragm 7 moves away from the end of internal spigot 6 when the liquid pressure in chamber 5 exceeds the force created by the air pressure in chamber 11 which acts on diaphragm 7. By adjusting the air pressure In chamber 11 the valve may be activated at any desired pressure, subject to the specification of the materials of the diaphragm and the other components of the fitting.

When the pressure of the liquid in chamber 5 exceeds the force created by the air pressure in chamber 11 which acts on diaphragm 7, liquid flows into the hollow centre of internal spigot 6.

At one end of the internal spigot 6 there is provided a metering valve assembly 14 which comprises a metering block 15 which is locked into the main body 2 by suitable locking means and a rotatably mounted outlet selector 16 having a grip portion 17, the valve assembly 14 being held in place by a cap 18.

The metering block 15 has an internal chamber 23 around the circumference of which there are located a plurality of apertures 24, 25 and 26 of different diameters. The outlet selector 16 is also provided with an aperture 22. By grasping the grip portion 17, the outlet selector can be rotated so that aperture 22 is aligned with a desired one of the apertures 24, 25 or 26. The diameters of the apertures 24, 25 and 26 determine the flow of liquid through aperture 22 into outlet chamber 27 which has a portion 28 adapted to receive a spray nozzle or dribble bar for instance.

The interface between the internal spigot 6 and the metering block 23 is sealed by an "O" ring 21. The interface between the metering block 23 and the outlet member is similarly sealed by an "O" ring 20. The interface between the outlet selector 16 and the cap 18 is sealed by an "O" ring 19.

Cap 18 may be attached to the main body 2 by means of a bayonet fitting or by threads.

The outlet selector 16 and cap 18 may be provided with means to indicate which of the outlets 24, 25 or 26 is in alignment with the aperture 22.

Figure 3:
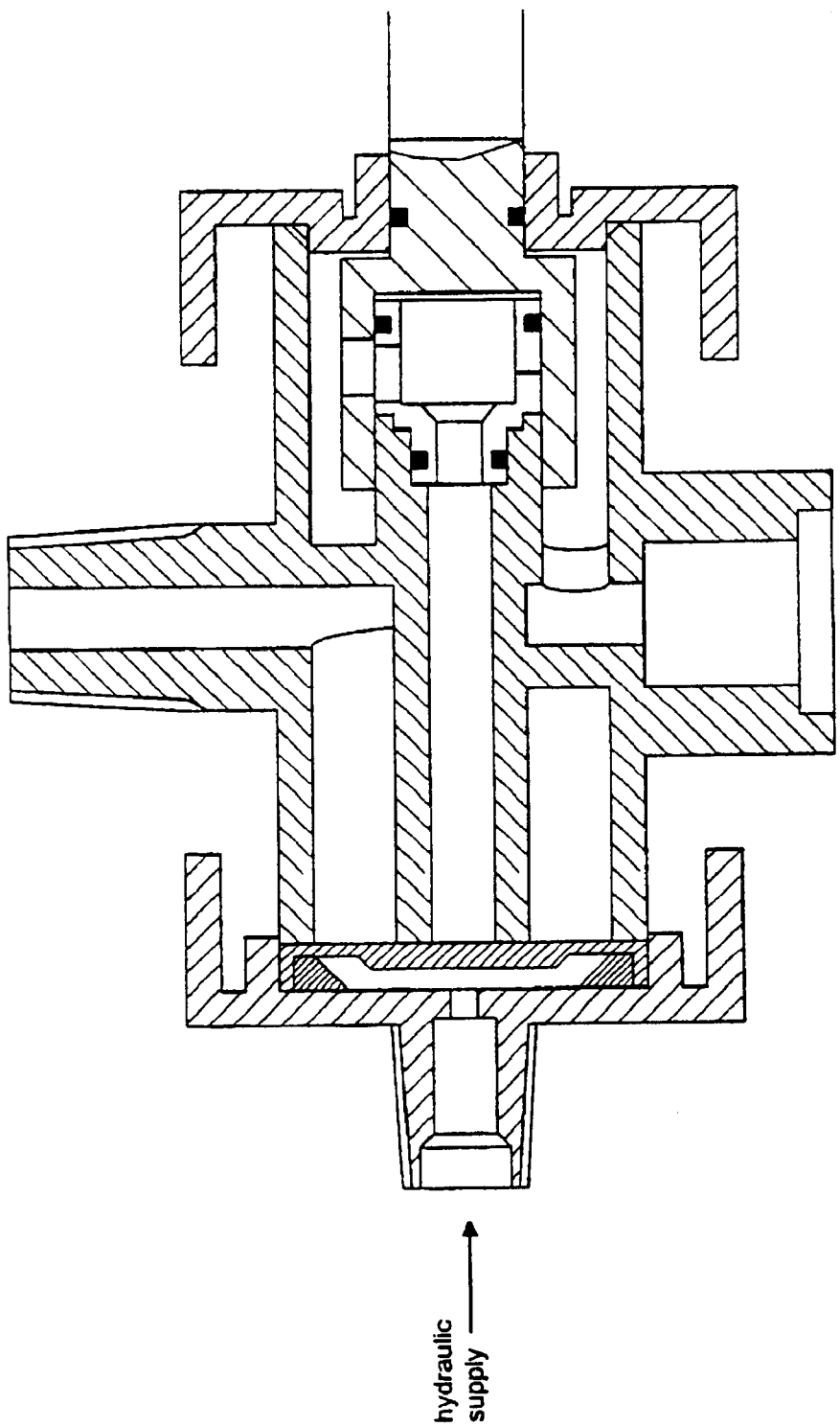
FIG. 3 is a cross-section through a sprayer fitting having an hydraulic check valve and a metering valve according to the invention.

The fitting shown in FIG. 3 is identical to the fitting shown in FIG. 2 but the elastomeric diaphragm 7 is actuated hydraulically rather than pneumatically.

Figure 4:
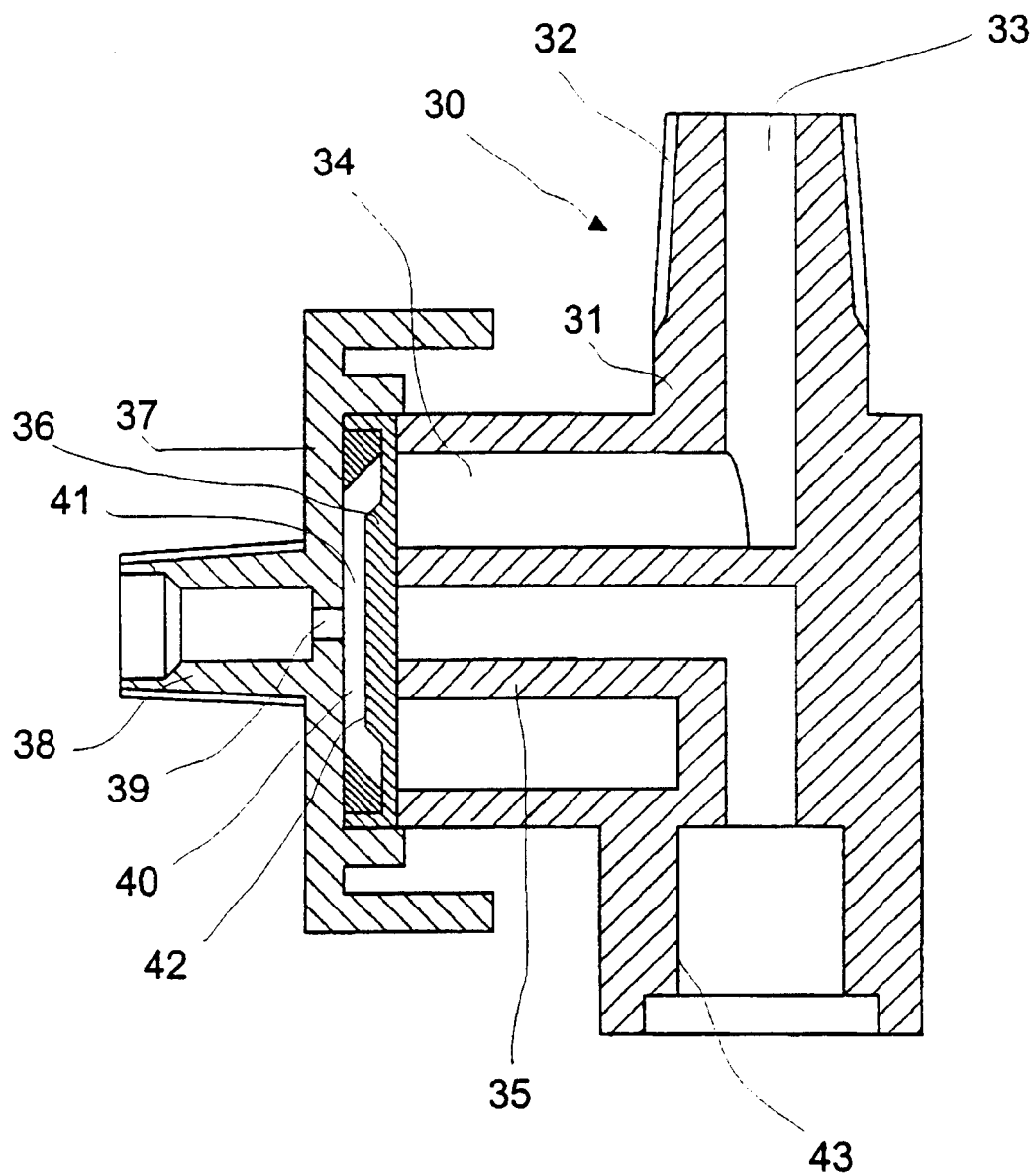
FIG. 4 is a cross-section through a sprayer fitting having a pneumatically or hydraulically operated check valve according to the invention.

Referring now to FIG. 4, there is shown a fitting 30 having a main body 31 which is externally threaded 32 to provide for attachment of the fitting to a sprayer boom (not shown). Attachment of the fitting to a sprayer boom may be provided by a damp arrangement or a spigot instead of a screw thread. The main body 30 is provided with an inlet in the form of a bore 33 which enters into the inlet chamber 34 of the body 31. Running centrally through the inlet chamber 34 is an internal spigot 35 which is hollow to allow liquid to flow therethrough. An elastomeric diaphragm 36 sits on one end of the body 31 and the internal spigot 35 to prevent the flow of liquid through bore 33, inlet chamber 34 and through the hollow internal spigot 35. Diaphragm 36 is held in position by an end cap which may be attached to the main body 31 by means of a bayonet fitting or threads. The cap 37 is provided with an attachment member 38 suitable for attachment to an air or hydraulic fluid supply. Cap 37 has an aperture 39 therein which permits the passage of air or hydraulic fluid into the chamber 40 between the inner face 41 of the cap 37 and the outer face 42 of the diaphragm 36. The effect of supplying air or hydraulic fluid is to pressurize the chamber 40. Diaphragm 36 moves away from the end of internal spigot 6 when the liquid pressure in chamber 34 exceeds the force created by the air or hydraulic pressure in chamber 40 which acts on diaphragm 36. By adjusting the air or hydraulic pressure in chamber 40 the check valve may be activated at any desired pressure, subject to the specification of the materials of the diaphragm and the other components of the fitting.

When the pressure of the liquid in chamber 34 exceed the air pressure in chamber 40, liquid flows into the hollow centre of internal spigot 35.

One end of internal spigot 35 has a portion 43 adapted to receive a spray nozzle or dribble bar for instance.

Figure 5:
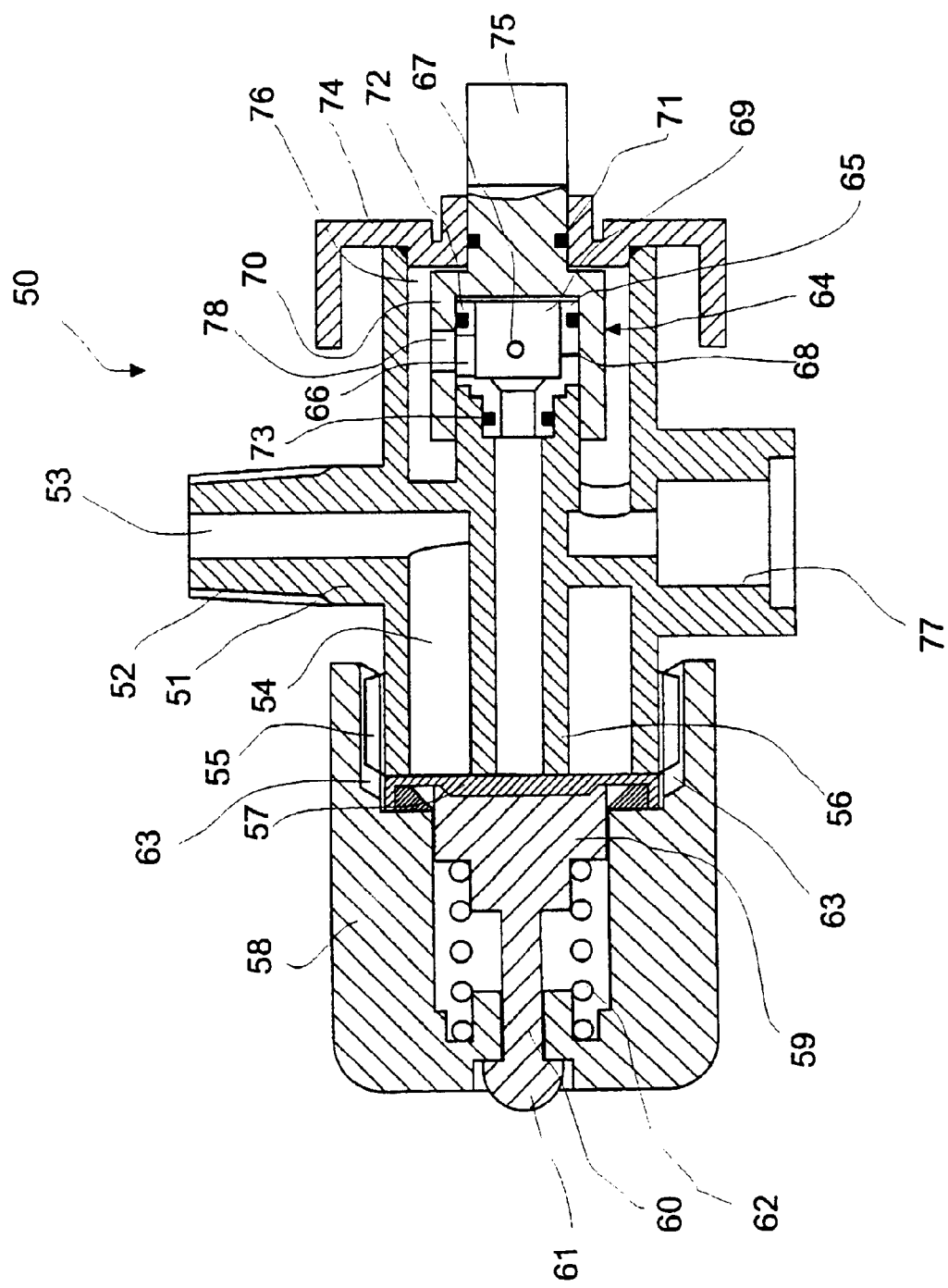
FIG. 5 is a cross-section through a sprayer fitting having a check valve of the type found in the prior art and a metering valve according to the invention.

Referring to FIG. 5, there is shown a fitting 50 having a main body 51 which is externally threaded 52 to provide for attachment of the fitting to an outlet on a sprayer boom (not shown). Attachment of the fitting to a sprayer boom may be provided by a clamp arrangement or a spigot instead of a screw thread. The main body 51 is provided with an inlet in the form of a bore 53 which enters into the inlet chamber 54 of the body 51. Running centrally through the inlet chamber 54 is an internal spigot 56 which is hollow. An elastomeric diaphragm 57 sits on one end of the body 51 and the internal spigot 56 to prevent the flow of liquid through bore 53, inlet chamber 54 and through the hollow internal spigot 56. Diaphragm 57 is held in position by an end cap 58 which may be attached to the main body 51 by means of a bayonet fitting 55, 63 or alternatively by threads. The cap 58 has a piston 59 slidably mounted therein. The stem 60 of piston 59 slides in a bore in cap 58, inward movement of the piston being limited by cap 61. Piston 59 is biased by spring 62 to force diaphragm 57 into a position where liquid may not flow through bore 53, chamber 54 and subsequently into internal spigot 56. When the pressure in the liquid exceeds the force generated by the spring, the piston 59 moves backwards to permit the flow of fluid from bore 53, through chamber 54 and into the hollow centre of internal spigot 56.

At one end of the internal spigot 56 there is provided a metering valve assembly 64 which comprises a metering block 65 which is suitably locked into the main body 51 and a rotatably mounted outlet selector 70 having a grip portion 75, the valve assembly 64 being held in place by a cap 74.

The metering block 65 has an internal chamber 69 around the circumference of which there is located a plurality of apertures 66, 67 and 68 of different diameters. The outlet selector 70 is also provided with an aperture 78. By grasping the grip portion 75, the outlet selector can be rotated so that aperture 78 is aligned with a desired one of the apertures 66, 67 or 68. The diameters of the apertures 66, 67 and 68 determine the flow of liquid through aperture 78 into outlet chamber 76 which has a portion 77 adapted to receive a spray nozzle or dribble bar for instance. The interface between the internal spigot 56 and the metering block 65 is sealed by an "O" ring 73. The interface between the metering block 65 and the outlet selector is similarly sealed by an "O" ring 72. The interface between the outlet selector 70 and the cap 75 is sealed by an "O" ring 71.

Cap 74 may be attached to the main body 51 by means of a bayonet fitting or by threads.

The outlet selector 70 and cap 74 may be provided with means to indicate which of the outlets 66, 67 or 68 is in alignment with the aperture 78.

Figure 6:
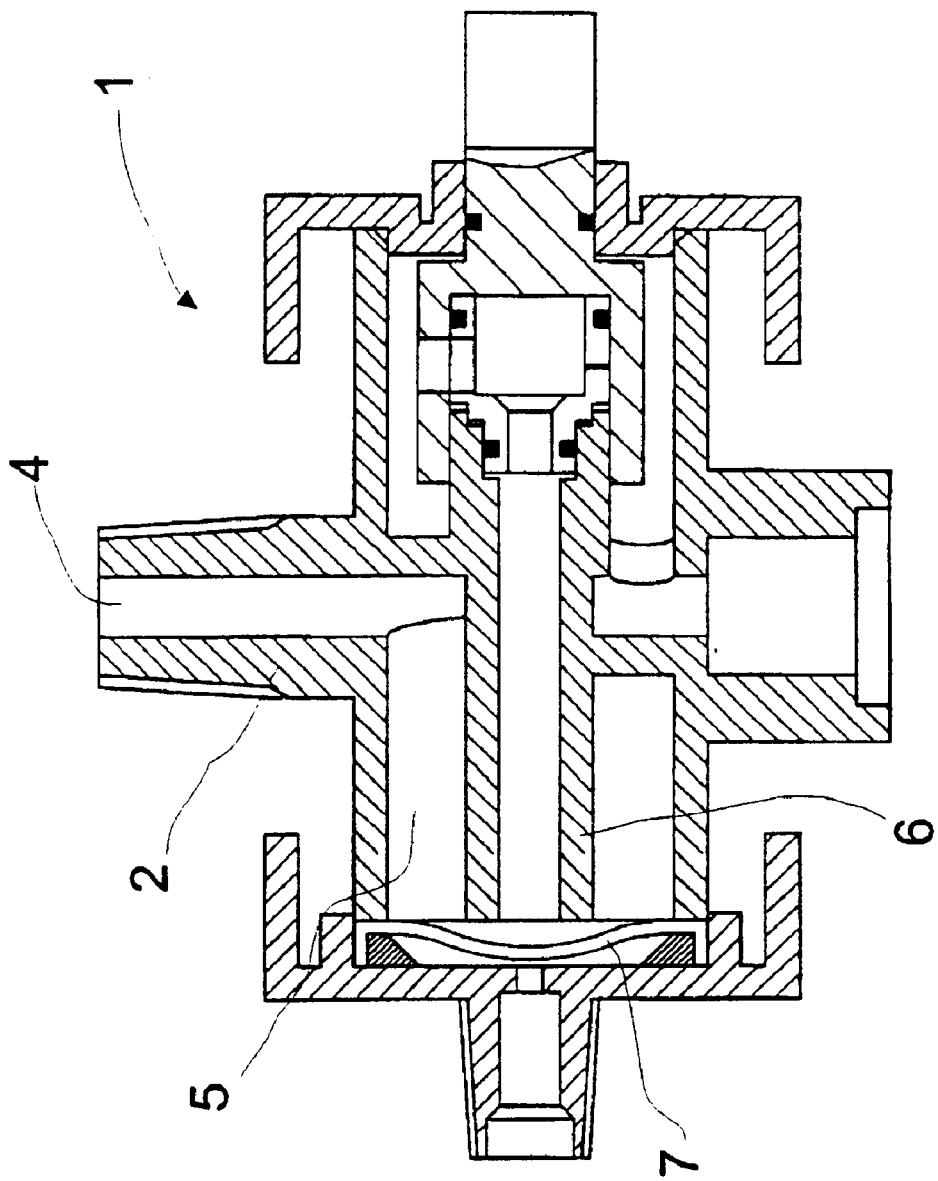
FIG. 6 is a cross-section through a sprayer fitting having a pneumatic check valve, with the check valve in its open position, and a metering valve according to the invention.

In FIG. 6 the fitting 1 shown in FIG. 2 is illustrated, but with the elastomeric diaphragm 7 in an open position which permits the flow of fluid through bore 4, chamber 5 and through the hollow centre of internal spigot 6.

Figure 7:
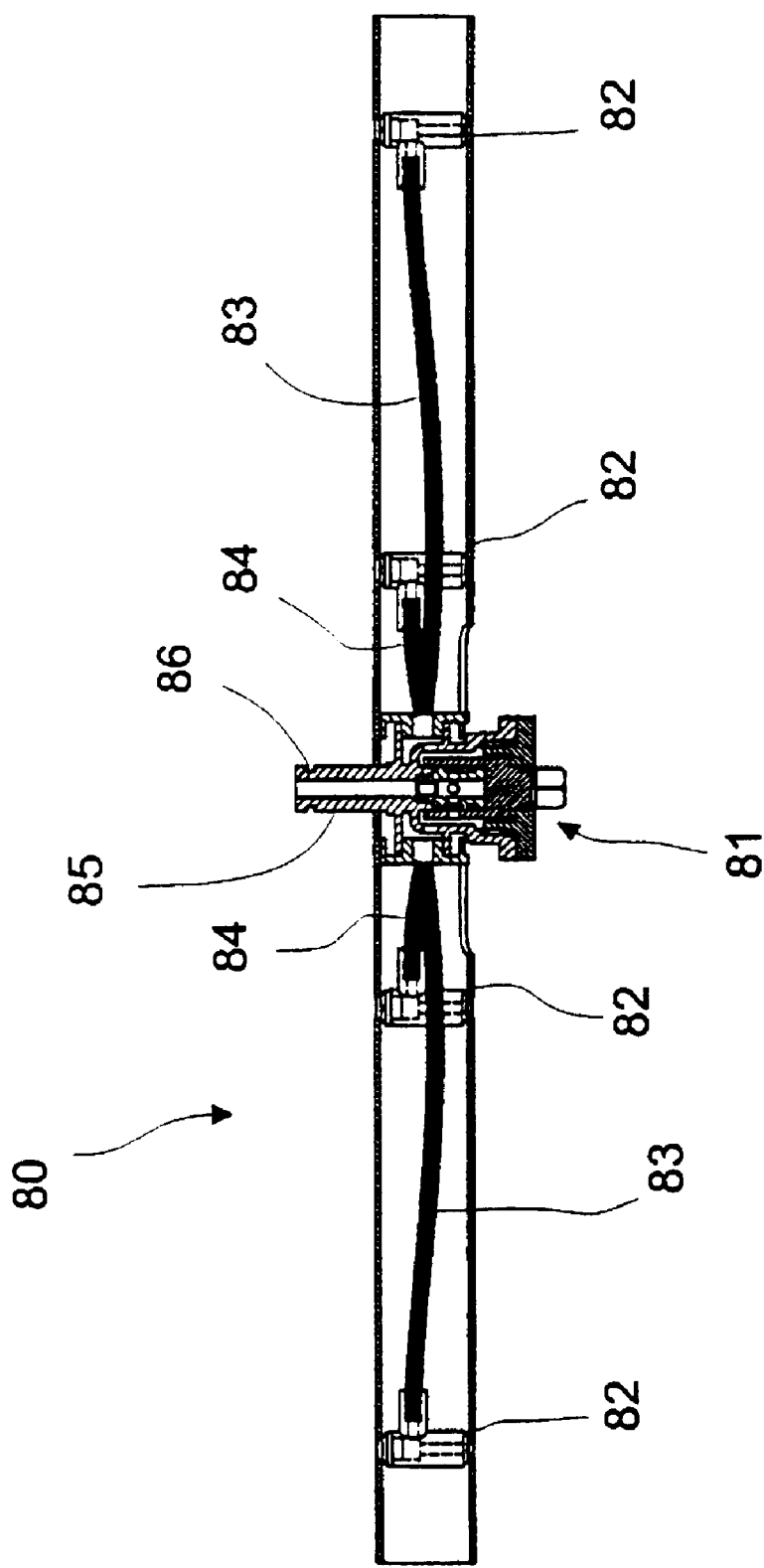
FIG. 7 is a cross section through a dribble bar, the outlets of the dribble bar being connected to a metering valve according to the invention.
Figure 8:
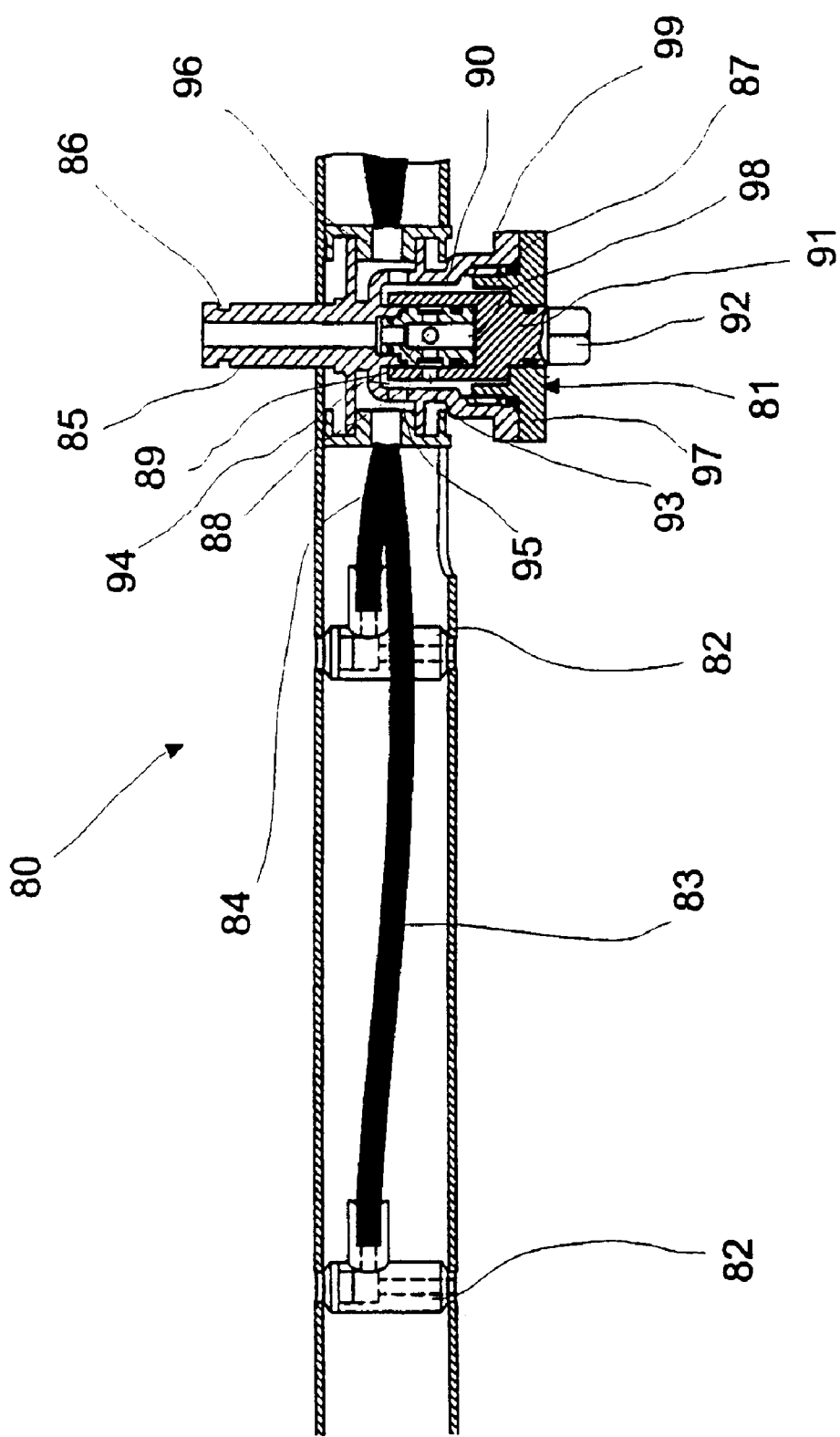
FIG. 8 is a cross-section through the a dribble bar as shown in FIG. 7, but to a larger scale.

FIGS. 7 and 8 illustrate a dribble bar 80 having a metering valve 81 according to the invention and a plurality of outlets 82, each outlet being connected to the metering valve by pipes 83, 84. A groove 86 is provided in stem 85 to permit fitting of the dribble bar 80 to a conventional sprayer outlet, or to a sprayer outlet provided with a check valve according to the present invention, such as that shown in FIG. 4.

FIG. 8 shows the metering valve 81 in detail, the metering valve comprising a metering block 87 and a rotatably mounted outlet selector 91 having a grip portion 92, the valve 81 being held in place by a cap 97.

The metering block 87 has an internal chamber 98 around the circumference of which there is located a plurality of apertures 88, 89 and 90 of different diameters. The outlet selector 91 is also provided with an aperture 93. By grasping the grip portion 92, the outlet selector can be rotated so that aperture 93 is aligned with a desired one of the apertures 88, 89 or 90. The diameter of the apertures 88, 89 and 90 determine the flow of liquid through aperture 93 into outlet chamber 94 which enters into portion 95 for connection to pipes 82, 83 by means of adapter 96.

The metering valve 81 is sealed by "O" rings where appropriate.

Cap 97 may be attached to the main body 99 by means of a bayonet fitting or by threads.

The outlet selector 91 and cap 97 may be provided with means to indicate which of the outlets 88, 89 or 90 is in alignment with the aperture 93.

Figure 1:
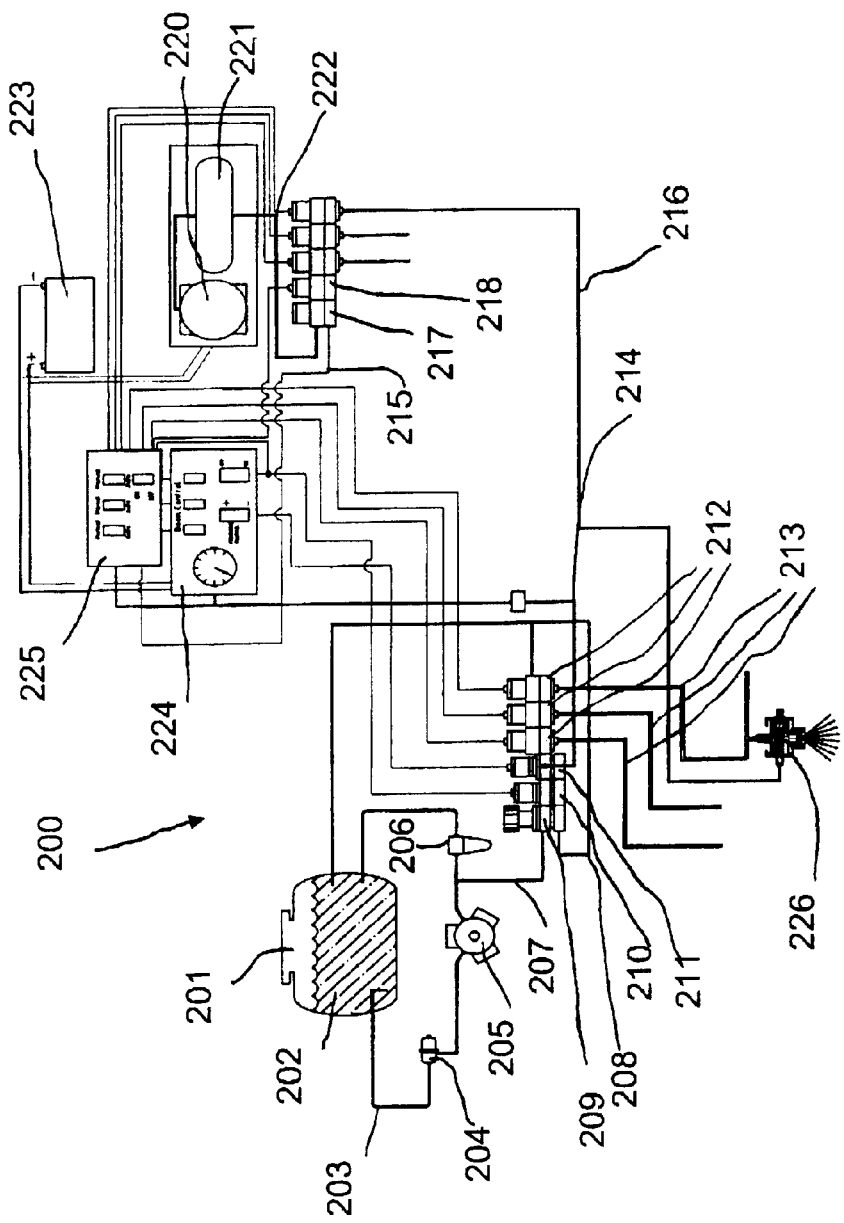
FIG. 1 is a schematic layout of a sprayer according to the invention.

Referring now to FIG. 1, there is shown a layout diagram for a sprayer 200 according to the invention, the sprayer comprising a tank 201 holding a liquid 202 to be sprayed through a fitting 226 according to the invention as shown in FIGS. 2 and 6.

A pipe 203 enters the base of tank 201, and liquid is drawn out of the tank by pump 205 through filter 204. To the down stream side of the pump 205 pipe 203 continues back to the tank 201, a by pass valve being provided between the pump 205 and the point at which the pipe 203 returns to the tank 201.

A pipe 207 branches from pipe 203 to supply liquid to a plurality of valves connected in series. The first valve is a hydraulic relief valve 209 which may be set manually or automatically monitored, and is connected to the second valve which is an on/off valve 210. If the pressure of the liquid in the hydraulic relief valve 209 exceeds a pre-set value, liquid is returned to the tank 201 through pipe 208. The third valve is a pressure control valve 211 which is connected to a sprayer control device 224. The sprayer control device has means to measure the pressure in the liquid and means to adjust the said pressure. Such devices are well known to those skilled In the art, and therefore the sprayer control device 224 is not described in detail. The third, fourth and fifth valves in the series are on/off valves 212. The purpose of the three valves 212 is to enable individual sections of the sprayer boom (not shown) to be switched on or off. The number of valves 212 corresponds to the number of sections of the boom. Pipes 213 connect to the on/off valves 212 and the sprayer fitting 226 to allow the liquid 202 to be sprayed as desired. Sprayer fitting is connected to an air line 216.

A compressor 220 is powered by battery 223, which also powers sprayer control device 224,225, and the battery 223 may be the battery of a tractor. Compressor 220 is pneumatically connected by air line 222 to reservoir 221, the air line 222 continuing from reservoir 222 to a series of valves. The first valve is an electrically controlled regulating valve 217 which is electrically connected 215 to a proportional control unit in the control box. The proportional control unit in the control box 225 detects the pressure in pipe 214 (set by the sprayer control device 224, 225) and sets the air pressure so that it is less than the pressure of the liquid, e.g. the liquid pressure may be set at 0.8 bar whilst the air pressure is set at 0.7 bar. The second valve 218 is simply an on/off valve, whilst each of valves 219 is an on/off valve. The number of valves 219 corresponds to the number of boom sections.

In operation, when the sprayer control device is switched to on, the air line 216 is pressurized to a desired degree, such as 0.7 bar. This means that if the pressure in the liquid falls below 0.7 bar, the check valve will not allow liquid to flow through the fitting 226.

The pressure of the liquid and/or the air pressure may be adjusted to any desired pressure within the normal range of pressures used for spray applications. The differential between the pressure of the liquid and the air pressure may be fixed or variable.

The number of on/off valves on the control side of the layout shown corresponds to the number of boom sections on the sprayer. The control side could be configured with only one on/off valve thereby treating the sprayer boom as if it were only one boom section, or with many on/off valves up to one on/off valve for each outlet.

In FIG. 1, the pneumatic lines 216 and corresponding proportioner, controls and pressurising means may be replaced by electrical transducers, controls and solenoid valves at the outlets.

Figure 9:
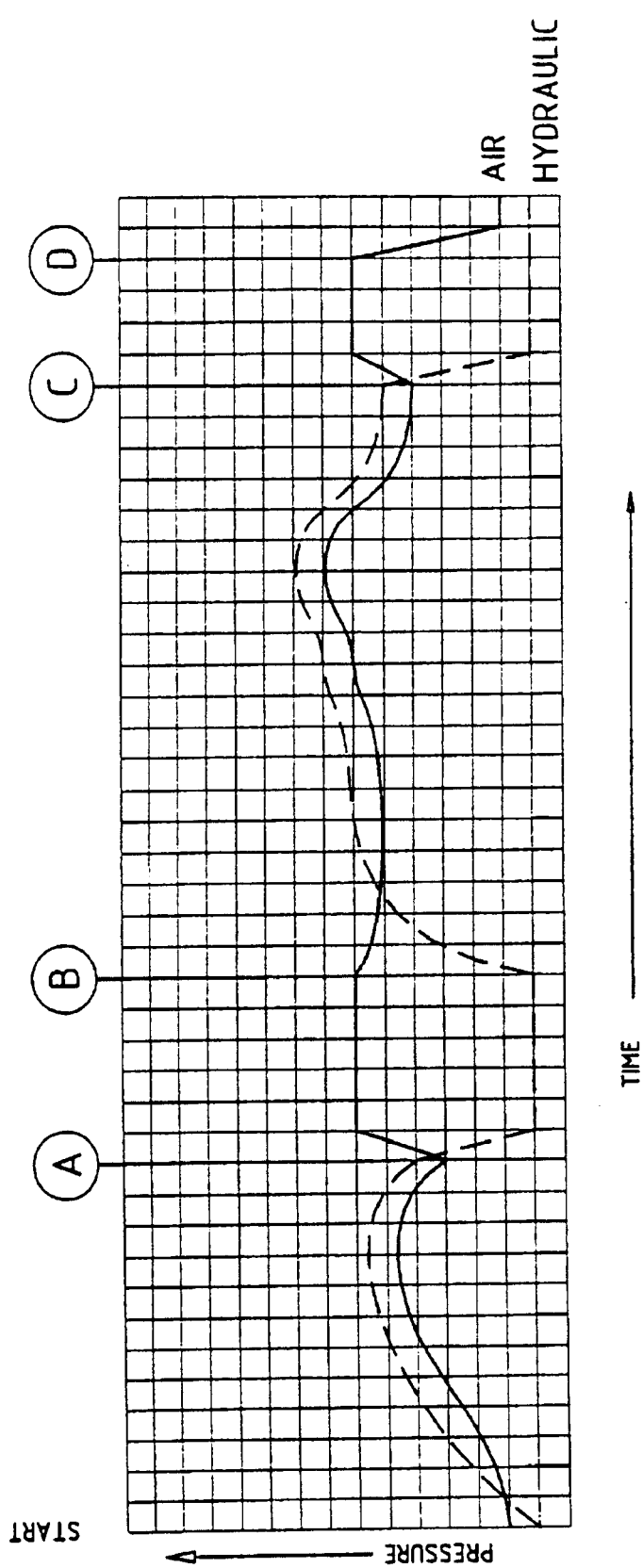
FIG. 9 is a graph showing a pressure sequence for sprayer operation as monitored and followed by the control system shown in FIG. 1.

Referring now to FIG. 9, there is shown a pressure sequence for sprayer operation as monitored and followed by the control system shown in FIG. 1. From the start of sprayer operation to time A, the hydraulic pressure (shown by the broken line) rises from zero to the operating pressure of 2.8 bar. The air pressure (shown by a solid line) rises from 0.5 bar to 2.3 bar. At the start, the air pressure is greater than the hydraulic pressure, thereby ensuring shut off of the outlets. The control system is set up so that the air pressure remains approximately 20 percent less than the hydraulic pressure and it can be seen that when the operator reduces the hydraulic pressure, so the air pressure falls.

At A the operator switches off either a valve 112 or the main on/off valve 110. This causes a rapid drop in hydraulic pressure. Upon detecting this rapid drop in pressure, the control system causes the pneumatic pressure to rise above the last maximum detected hydraulic pressure. The control system may be set up to cause the pneumatic pressure to rise to 20 percent above the last maximum pressure detected. The control system may be set up to cause the pneumatic pressure to rise to above the maximum detected hydraulic pressure detected in a given time interval, e.g. a 30 second interval preceding shut off of the hydraulic supply. The pneumatic pressure remains constant until the valve 112 or the main on/off valve 110 is switched on again at B. The control system may be set up provide a fixed level of positive or negative bias, rather than bias which is proportional to the hydraulic pressure detected. For example, the air pressure could be a fraction of a bar greater than the hydraulic pressure at start up, and a fraction of a bar less than the hydraulic pressure when the hydraulic pressure exceeds the shut-off pressure.

Between B and C, the hydraulic pressure rises which causes the pneumatic pressure to fall until it is 20 percent below the hydraulic pressure.

At C the operator switches off a valve 112 or the main on/off valve 110. The pneumatic pressure again rises to 20 percent greater than the last detected hydraulic pressure and remains at that level, thereby ensuring complete shut-off, until the operator re-sets the system at D where the pneumatic pressure drops to the minimum start pressure.

Referring now to FIG. 10, there is shown a metering device, the comprising a body 100 which is moulded from plastics. The body comprises a stem 101 having a groove 102 therein to permit fitting of the body to a conventional sprayer outlet, or to a sprayer outlet provided with a check valve according to the present invention. The stem is bored 103, the bore opening into a chamber 111. In the chamber there is mounted an outlet selector 106 and a metering block 107. The metering block 107 comprises an inlet chamber 108 and outlets 109, 110 and another outlet which is not shown. The outlet selector 106 is provided with one outlet, the diameter of which is not less than the diameter of the largest outlet of the metering block 107. One end of the metering block is provided with a grip portion which extends outwardly from the body 100. By gripping the grip portion the sprayer operator can rotate the metering block and align a different aperture with the aperture of the outlet selector 106, thereby altering the flow of liquid through the outlet selector 106. The outlet selector 106 is held in place in the chamber 111 by means of a clip 113.

The body 100 further comprises outwardly extending connecting portions 104, each portion 104 being provided with chambers 105 with which pipes may be connected, apertures 112 being provided between the chambers 105 and the chamber 111 to permit liquid to flow out of chamber 111 and subsequently out of the body 100.

Figure 11A:
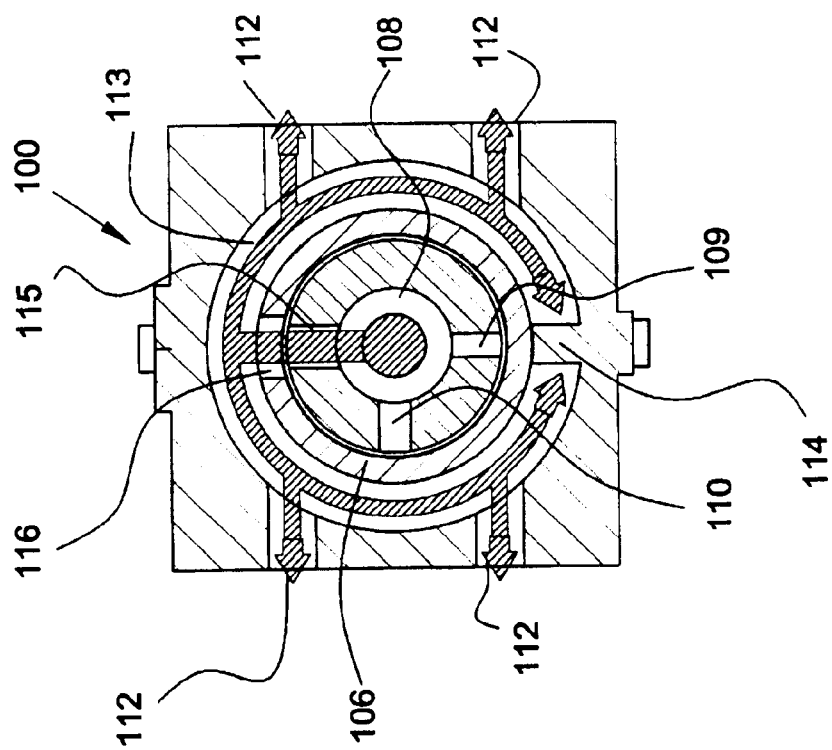
FIG. 11a is a cut away schematic elevation of the metering device according to the invention without a barrier.

FIG. 11a shows the body 100 and the liquid flow path therethrough. Fluid entering chamber 108 passes through the aligned apertures 115 and 116 into the chamber 111. It can be seen that a rotational flow of liquid tends to occur. This can lead to the volumes of fluid leaving through the apertures 112 being uneven. This is an undesirable effect.

Figure 11B:
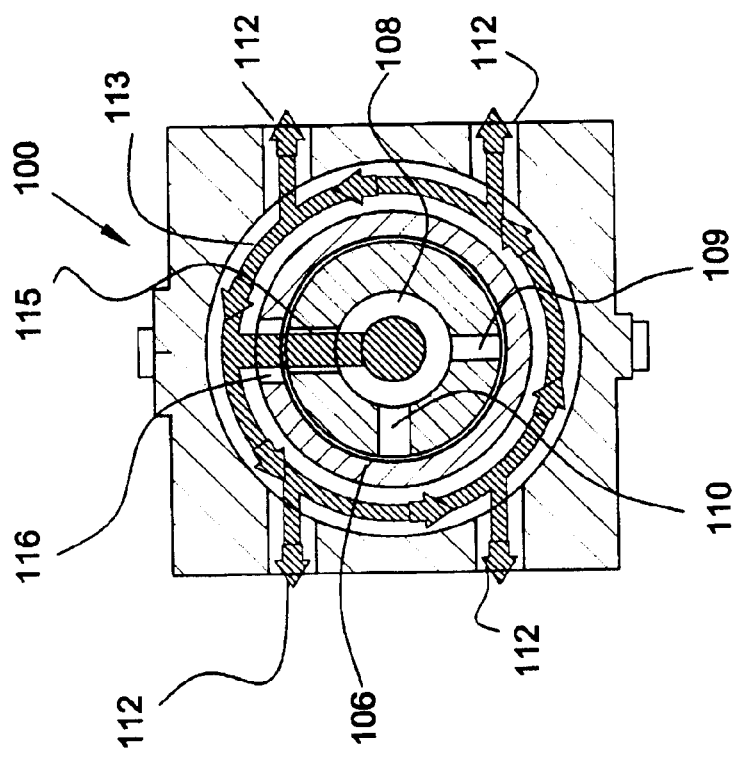
FIG. 11b is a cut away schematic elevation of the metering device according to the invention with a barrier.

FIG. 11b shows an embodiment similar to that shown in FIG. 11a, and like numerals are used to identify like parts. In the chamber 111 there is provided a barrier 114 which extends outwardly from the wall of the chamber 111 towards the outlet selector 106. From the arrows indicating the flow of liquid through the chamber 111 it can be seen that rotational flow does not occur. Because of this, the flow through each of the apertures 112 is substantially equal. In FIG. 11b, there are two apertures 112 on either side of the body 100, and the barrier is located on the vertical centreline of the body opposite the outlet 116. The amount of liquid flowing through the apertures on one side of the body depends on the position of the outlet 116 with respect to the barrier 114. In the embodiment shown in FIG. 11b, the amount of liquid flowing through the apertures on one side of the body may be altered by changing the position of the barrier 114. In FIG. 11b, if the barrier were moved to the left. a greater volume of liquid would pass through the apertures 112 on the right hand side of the body, and if the barrier were moved to the right, a greater volume of liquid would flow through the apertures 112 on the right hand side of the body 100.

If the number of outlets 112 on one side of the body 100 differs from the number of outlets on the other side of the body, then it may be necessary to move the position of the barrier in order to ensure that the same amount of liquid flows through each aperture.

Figure 12:
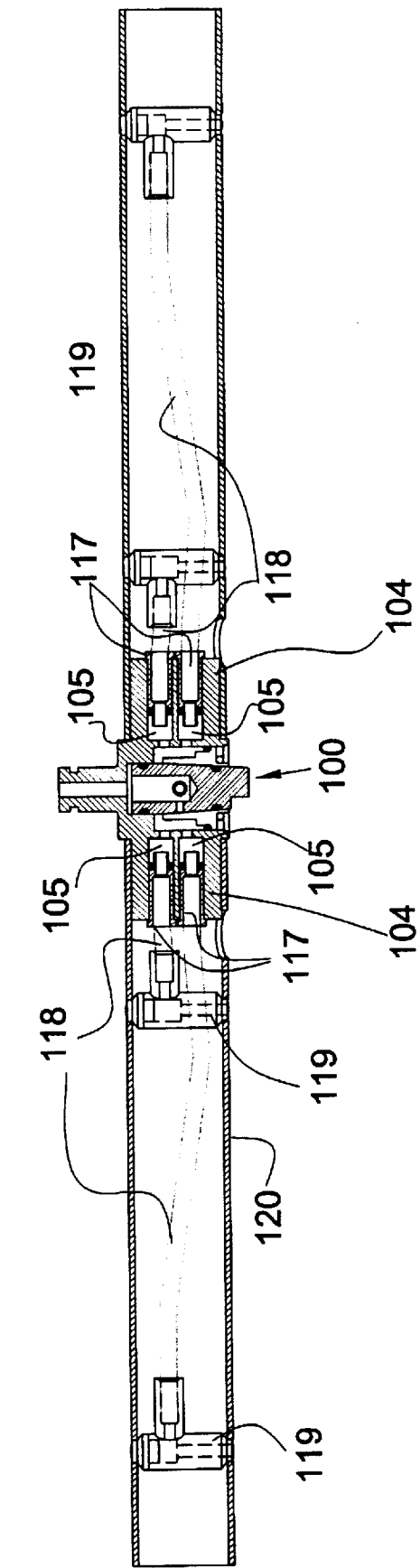
FIG. 12 is a cross-section through a dribble bar applicator, the outlets of the dribble bar being connected to a metering valve according to the invention.

In FIG. 12 there is shown a dribble bar having a selector valve mounted therein. The tubular members 120 of the bar are pushed on to the outwardly extending portions 104 of the body 100. Nozzles 119 are mounted in each tubular member 120 and are connected to the body 100 by pipes 118, one end of the pipe being attached to a nozzle, and the other end being attached to a plug 117 which fits into the chamber 105.

Figure 13:
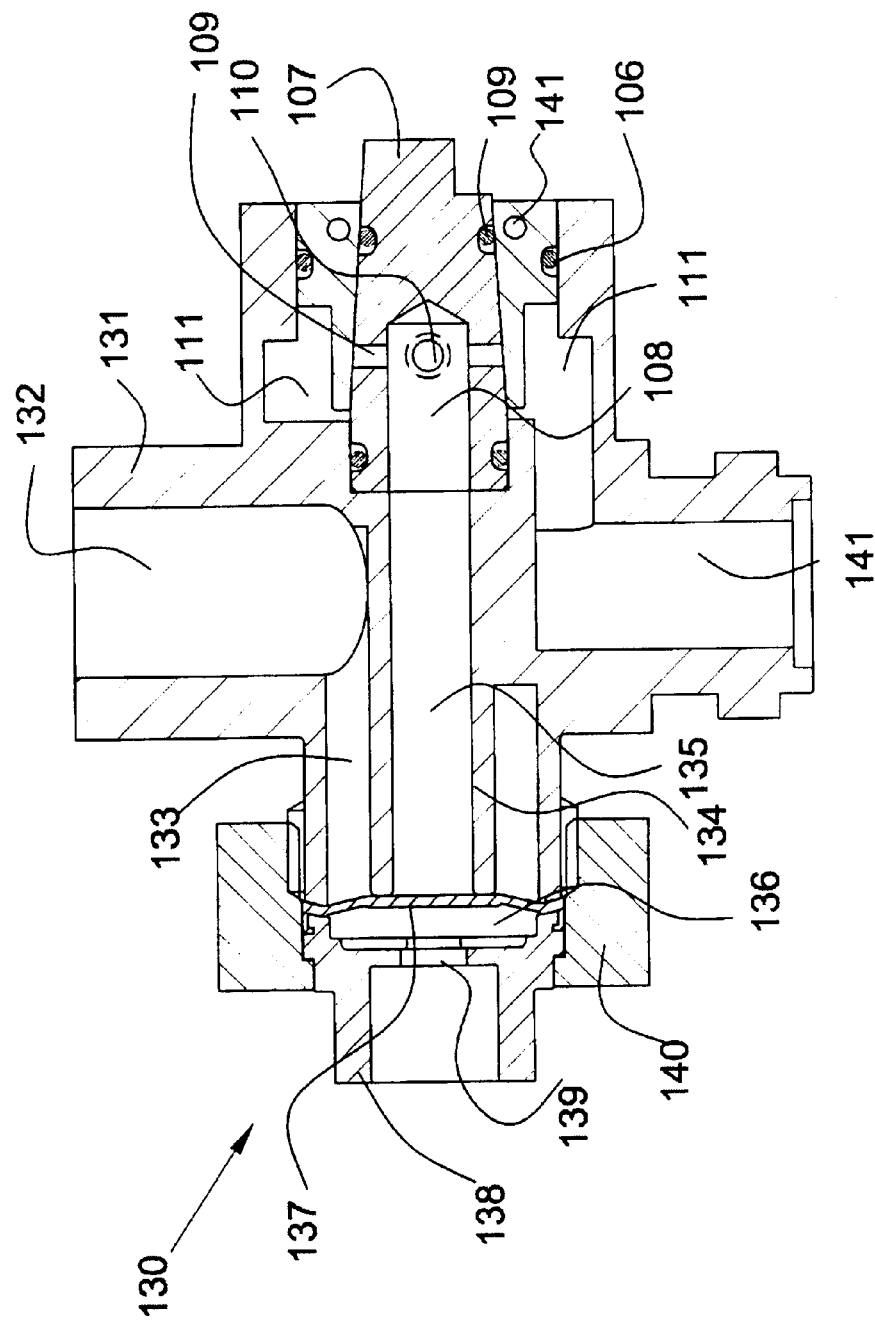
FIG. 13 is a cross-section through a sprayer fitting having a pneumatically or hydraulically operated check valve according to the invention.
Figure 14:
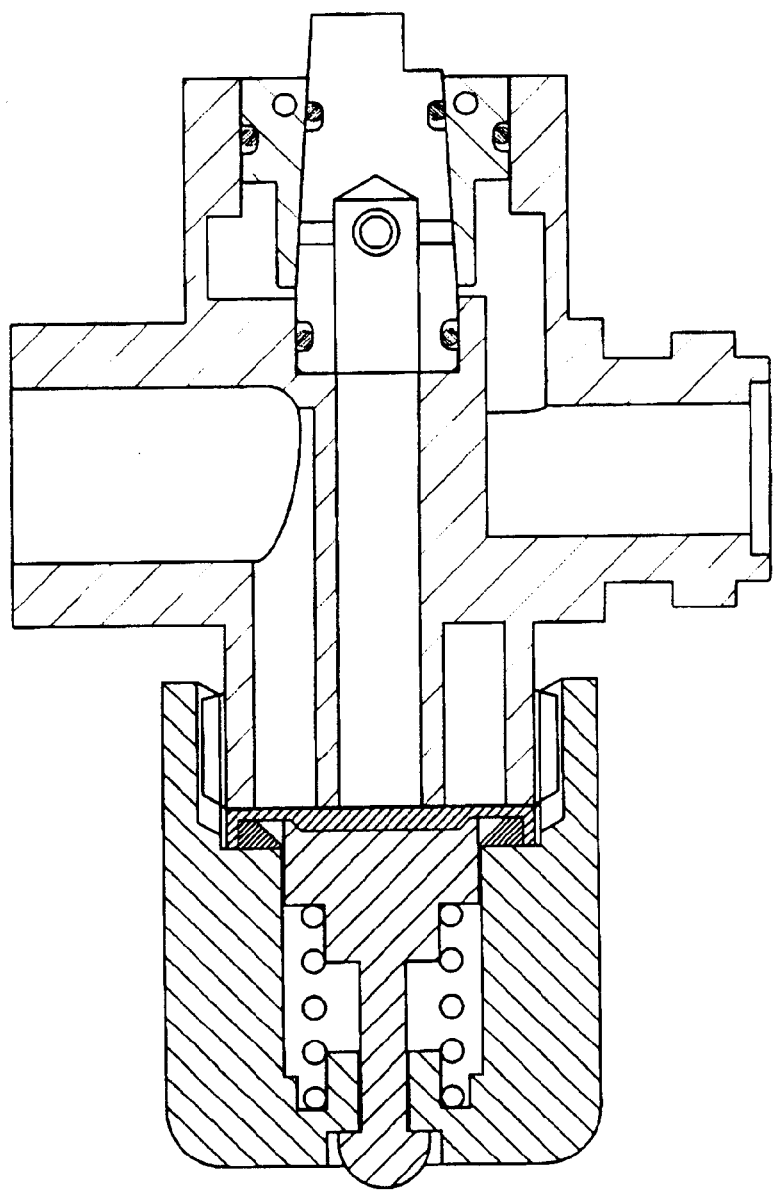
FIG. 14 is a cross-section through a sprayer fitting having a check valve of the type found in the prior art and a metering valve according to the invention.

FIG. 13 illustrates a fitting 130 for attachment to a sprayer boom outlet having a main body 131 having an inlet in the form of a bore 132 which enters into the chamber 133. Running centrally through the inlet chamber 133 is an internal spigot 134 which is hollow. An elastomeric diaphragm 137 is positioned between one end of the body 131 and the internal spigot 134 to prevent the flow of liquid through bore 132, inlet chamber 133 and through the chamber 135 of internal spigot 134. Diaphragm 137 is held in position by an end cap 138 which is attached to the main body 2 by means of a threaded ring member 140. The cap 138 is attachable to an air supply. Cap 138 has an aperture 139 therein which permits the passage of air into the chamber 136 between the inner face of the cap 138 and the outer face of the diaphragm 137. The effect of supplying air is to pressurize the chamber 136. Diaphragm 137 moves away from the end of internal spigot 134 when the liquid pressure in chamber 135 exceeds the force created by the air pressure in chamber 136 which acts on diaphragm 137. By adjusting the air pressure in chamber 136 the valve may be activated at any desired pressure, subject to the specification of the materials of the diaphragm and the other components of the fitting.

When the pressure of the liquid in chamber 135 is equal to or exceeds the force created by the air pressure in chamber 136 which acts on diaphragm 137, liquid flows into the hollow centre of internal spigot 134. The diaphragm 137 is described in greater detail with reference to FIG. 15.

At one end of the internal spigot 134 there is provided a metering valve assembly which comprises an outlet selector 106 which is locked into the main body 132 by suitable locking means and a rotatably mounted metering block 107 having a grip portion extending outwardly of the main body 131, the valve assembly being held in place by a dip 141.

The metering block 107 has an internal chamber 108 around the circumference of which there is located a plurality of apertures 109, 110 of different diameters. The outlet selector 106 is also provided with an aperture (not shown). By grasping the grip portion the metering block can be rotated so that the desired aperture is aligned with the of the outlet selector. The diameters of the apertures 109, 110 determine the flow of liquid into outlet chamber 111 which has a portion 141 adapted to receive a spray nozzle or dribble bar for instance.

"O" rings are used to seal interfaces between components.

Means may be provided to indicate which of the outlets 109, 110 is in alignment with the aperture of the outlet selector.

Referring now to 14 there is shown a fitting similar to that shown in FIG. 13, except that the check valve is a check valve according to the prior art as opposed to being a check valve according to the invention.

Figure 15:
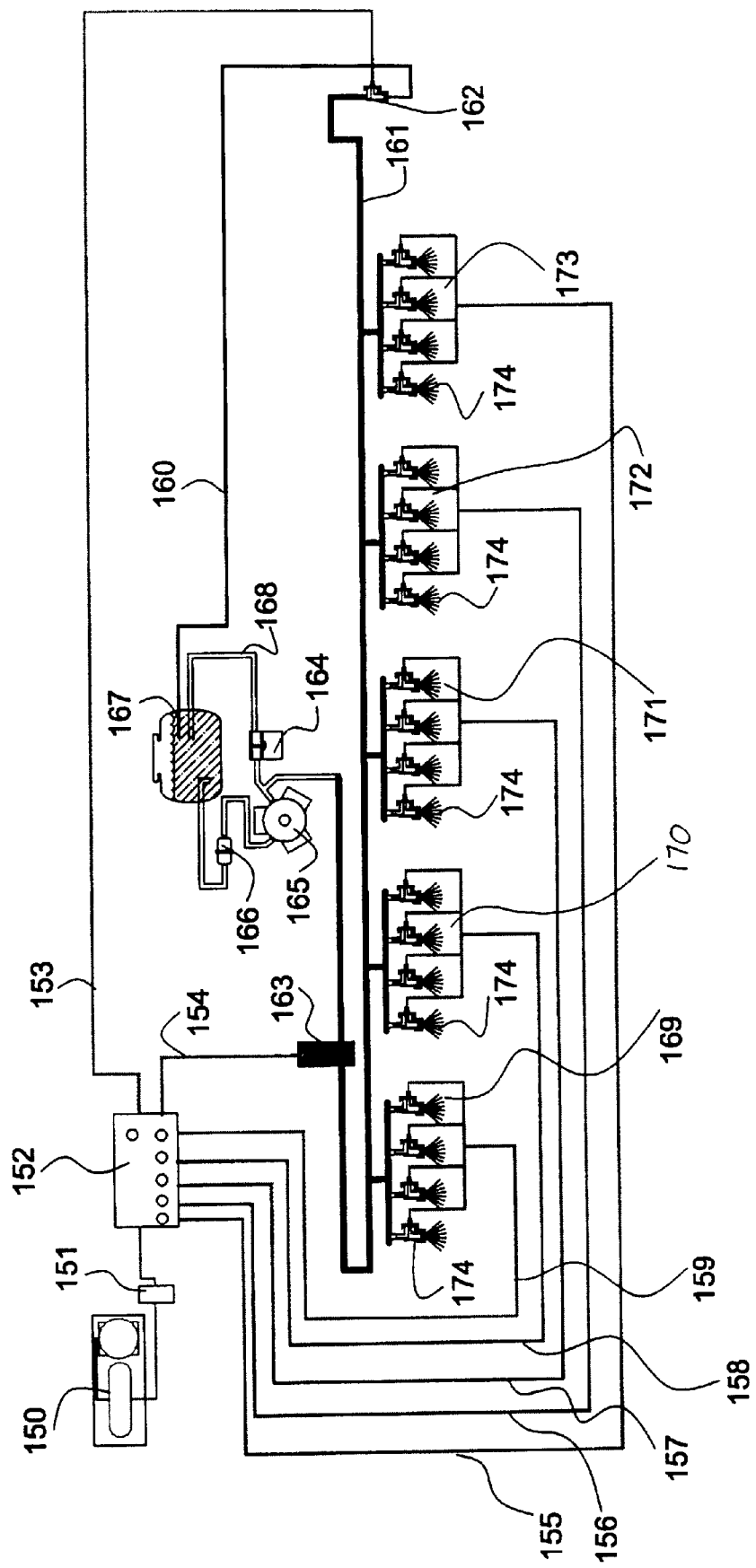
FIG. 15 is a schematic layout of a sprayer fitted with check valves of the invention which uses these valves as the means of boom section control.

Referring now to FIG. 15, there is shown a sprayer having a tank 167, a pump 165, a filter 166 and a pressure regulator 164. The pump 165 draws fluid from the tank through the filter, and then pumps the fluid into the feed line 161. The feed line 161 is provided with a check valve 162, which is also connected to return line 160. The check valve 162 may be opened or closed to permit or prevent the flow of fluid through the return line 160 back to the tank. The sprayer is provided with an air supply 150, a filter 151, and a controller 152. The controller 152 controls the supply of air via air supply lines 153, 155, 156,157 and 158 to the check valves 174 mounted on boom sections 169 to 173, and 162 which opens or closes the line 160 which permits return to tank. It can be seen that the sprayer also comprises a sensing line 154 connected at one end to a sensor 163, which senses the fluid pressure in the feed line 161, and at the other end to the controller 152. The controller is arranged so that there is either a fixed or proportional relationship between the pressure in the air lines and the fluid pressure in the fluid line 161. The check valves 174 are either open or closed.

The controller can supply a high air pressure to any of the boom sections 169 to 173, thereby permitting boom sections to be turned on or off as the operator desires. When boom sections are turned off, the pressure regulator 164 ensures that the pressure in the feed line 161 remains constant by returning more fluid back to the tank 167 through line 168.

The valve 162 may be adapted to allow constant recirculation of fluid back to the tank 167. This is achieved by controlling the size of the outlet from valve 162, and thereby controlling the volume of fluid flowing therethrough. The check valve 162 may comprise a metering valve as described herein to provide for different flow rates back to the tank 167. Alternatively, a regulating valve such as a rotary valve or a gate valve may replace the check valve 162.

Figure 16:
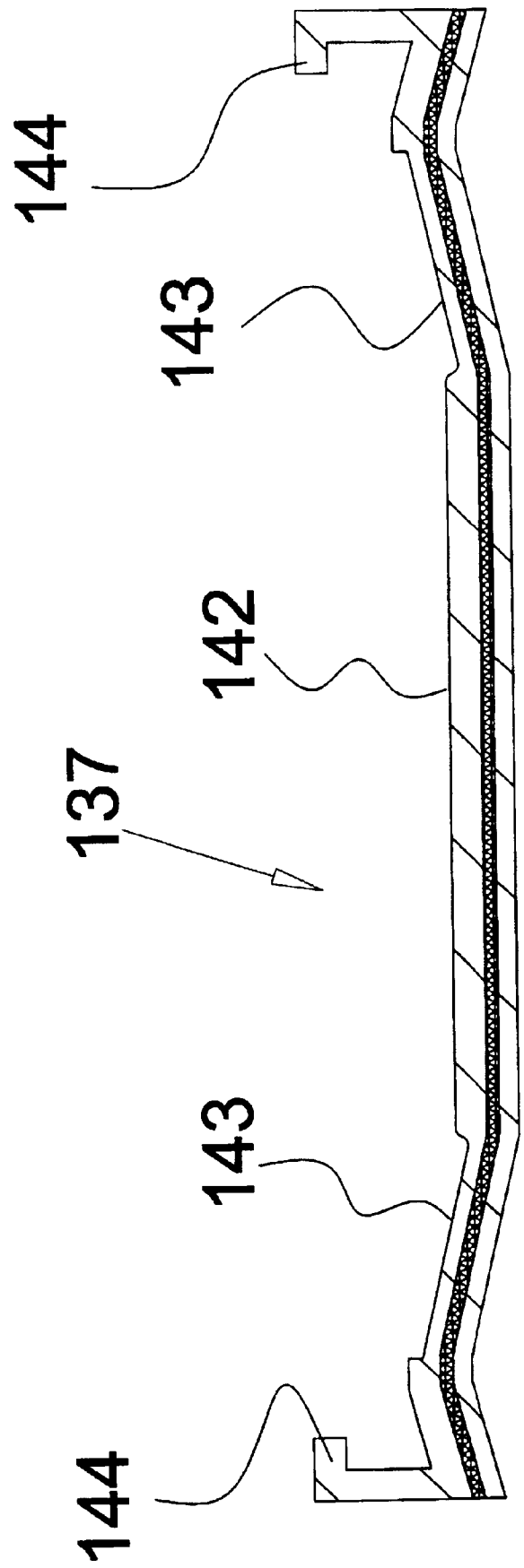
FIG. 16 is a cross-section of a diaphragm for use in a metering device according to the invention.

FIG. 16 illustrates a type of diaphragm which is particularly useful in the check valve according to the invention. The diaphragm 137 comprises a seat portion 142 which sits on the end of the internal spigot 134, end portions 144 which provide for attachment of the diaphragm to the main body 132. Between the seat portion and the end portions 144 are rolling portions 143. It is these rolling portions which stretch in response to changes in air or liquid pressure. The rolling portions are arranged so that they are in tension when the seat portion is seated on the internal spigot. A small positive pressure must be present in the chamber 136 for the internal spigot to be sealed off. This means that as soon as the air pressure is released, the seat portion 142 will move away from the internal spigot and fluid will flow from the chamber 133 and through the chamber 135.

What is claimed is:

1. A rotary metering valve, comprising a body containing a chamber with an outlet thereto, and a metering block located in the chamber and having an inlet connectable to a fluid supply, at least one outlet, and an outlet selector having at least one aperture therein for alignment with an outlet of the metering block to permit flow of the fluid therethrough, wherein the outlet selector and the metering block are relatively rotatable one with respect to the other, means being provided to rotate one of the outlet selector and the metering block, at least one of the metering block and the outlet selector having a plurality of outlets such that relative rotation enables different fluid flow rates to be achieved, wherein the chamber has a plurality of outlets therefrom whereby fluid flowing from the metering block is supplied to all of said outlets, and a barrier extending between a wall of the chamber and the metering block to prevent fluid flowing in a 360° rotary motion around the metering block.

2. The rotary metering valve according to claim 1, where in the chamber has four outlets.

3. The rotary valve according to claim 1, wherein the metering block is provided with a plurality of outlets and the outlet selector is provided with one aperture.

4. The rotary valve according to claim 1, wherein the metering block is fixed and the outlet selector is rotatable relative to the metering block.

5. The rotary valve according to claim 1, wherein the outlet selector is fixed and the metering block is rotatable relative to the outlet selector.

6. The rotary valve according to claim 1, wherein the outlet selector fits over the metering block.

7. The rotary valve according to claim 1, wherein the means to rotate the outlet selector comprises one selected from a group consisting of a hand grip, a lever, and spanner flats.

8. The rotary valve according to claim 1, further comprising a cap which holds the metering block and the outlet selector in position within the body.

* * * * *